July 30, 1929.    T. M. EYNON    1,722,738
DASHBOARD GAUGE FOR AUTOMOBILE GASOLINE TANKS
Filed Jan. 13, 1921    2 Sheets-Sheet 1
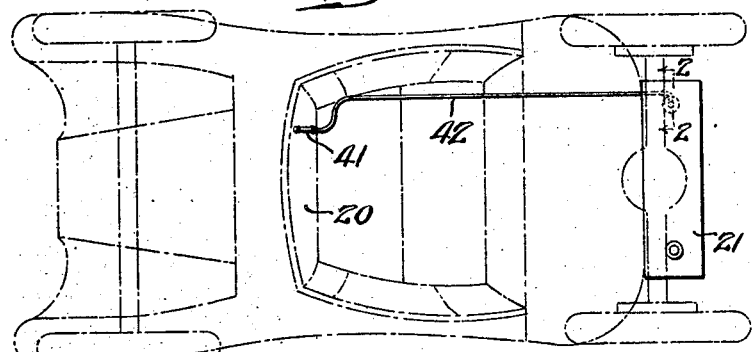
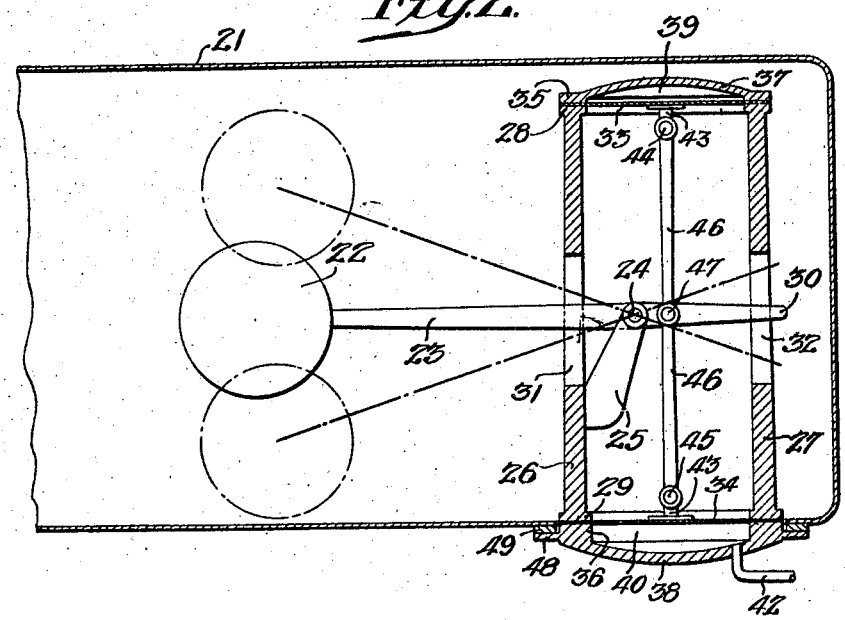
Inventor
Thomas M. Eynon.
Witness:
Walter Quim
by
Attorney.

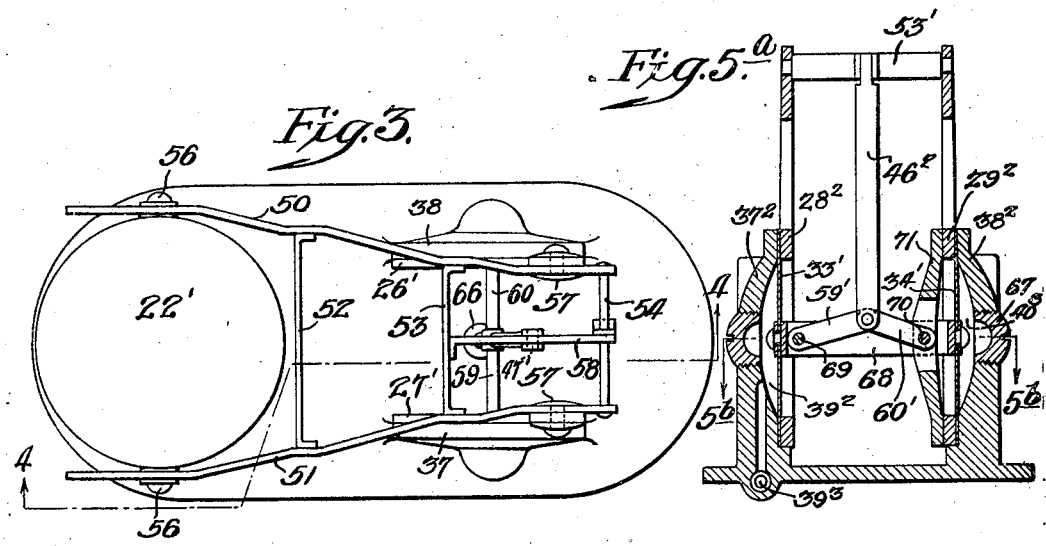

Patented July 30, 1929.

1,722,738

UNITED STATES PATENT OFFICE.

THOMAS M. EYNON, OF PHILADELPHIA, PENNSYLVANIA.

DASHBOARD GAUGE FOR AUTOMOBILE GASOLINE TANKS.

Application filed January 13, 1921. Serial No. 436,883.

My invention provides a conveniently located indicator, preferably upon the dash board, to show the depth of gasoline in the gasoline tank of an automobile.

The main purpose of my invention is to give automatic reliable fluid indication of the depth of liquid in the tank and where it can be observed readily.

A further purpose is to use a float within the tank as an indicator of the height of liquid therein but to transmit the indication through a fluid column operated by the float.

A further purpose is to use a float within a gasoline tank, to operate a diaphragm directly by movement of the float and thereby to transmit pressure of fluid on the other side of the diaphragm to a fluid indicator at the dash board.

A further purpose is to connect a float-operated lever or toggle with one or more diaphragms connecting with a fluid filled compartment or compartments and to indicate the height of the float by the height of this fluid in a gauge connected therewith.

A further purpose is to transmit the indication of the liquid height in a gasoline tank upon an automobile by proportional transmission of a separate fluid at substantially uniform pressure and a gauge for this fluid.

A further purpose is to eliminate variations in the pressure or vacuum within the gasoline tank as affecting the indication of the gasoline depth.

Further purposes will appear in the specification and in the claims.

I have preferred to illustrate my invention by a few only of the many constructions by which it may be carried out, selecting the forms shown because they are practical, effective and reliable and at the same time well illustrate the principles of my invention.

Figure 1 is a diagrammatic view showing the outline of an automobile and my invention as applied thereto.

Figure 2 is a fragmentary vertical longitudinal section of the tank taken on the line 2—2 in Figure 1.

Figure 3 is a top plan view of an alternate construction within the tank, whereby my invention may be carried out.

Figure 4 is a section of Figure 3 upon line 4—4.

Figure 5 is a section of Figure 4 upon line 5—5.

Figure 5$^a$ is a section corresponding to Figure 5 but showing an alternative form.

Figure 5$^b$ is a section of Figure 5$^a$ upon lines 5$^b$—5$^b$.

In the drawings, similar numerals indicate like parts.

Taking up those general forms of the invention first in which the pressure indication is obtained through transmission of a separate liquid which shows in a gauge and describing at the outset the structure shown in Figures 1 and 2:—

In the automobile shown in outline, the only parts of the car with which we are at present concerned are the dash board 20 and the tank 21. Within the tank and preferably secured to the bottom of the tank is a mount for a float 22. The character of the mount will differ, of course, greatly according to individual preferences and needs. In this form the float rod 23 is pivoted at 24 to a bracket 25 upon standards 26, 27, which are shown as supporting diaphragm rings 28, 29 at opposite ends. The rod 23 is extended at 30, and the rod is supported against lateral strain by the walls 31, 32 of slots in the standards 26 and 27.

The rings 28, 29 carry diaphragms 33, 34 which rest against the rings and seal against the annular flanges 35, 36 of a cap 37 and base 38, respectively, so as to provide spaces or compartments, 39 at the top and 40 at the bottom.

The space 39 is intended to be free from such pressure as there may be within the tank, where it is large enough for its variations in size not to be objectionable, may be a "dead" space.

The space 40, closed off by diaphragm 34, is filled with a liquid which is conducted from the space to the dash board gauge 41 by a pipe 42. The simplest form of gauge is evidently a glass and the glass is illustrated for this reason, though I recognize that other forms of fluid gauge could be used.

The two diaphragms carry lugs 43 to which are pivoted at 44, 45 connecting rods 46. The rod 23 engages the rods, as at 47 (in the illustration beyond the pivot 24) so that movement of the float moves both diaphragms varying the volumes of the two spaces 39 and 40 to increase one as the other is reduced.

This does not alter the volume of the tank space available for gasoline and air, and hence the system is "balance", i. e., has no tendency to move in either direction with variations in tank pressure.

Movement of the float upwardly, in the example, will cause the space 39 to enlarge and the space 40 to contract. Obviously, either of the spaces 39 and 40 could be used to transmit the indication and either can be made to enlarge when the float lowers, according to whether the pivot 24 is at the left or right of the pivot 47. The selection of space 40 is a matter of preference only. The liquid used in the space, pipe and gauge should be non-freezing. Oil, and alcohol are well suited for the purpose. The liquid is filled into the system until its level in the gauge corresponds with the gauge zero for an empty tank and the gauge is then graduated to correspond with the depths of gasoline for differing heights of liquid in the gauge. The sensitiveness of the reading can be adjusted in many ways, of which I would suggest variation in the internal diameter of the glass as the easiest.

The entire device is capable of separate manufacture and sale for application to existing tanks or of application to new tanks, by merely cutting an opening in the bottom of the tank and securing the head 38 or ring 29 to the edges of the opening, as by flanges 48, with or without the use of an intermediate ring 49. The intermediate ring, where used, may be secured separately to the tank, as a stiffening ring, or may be a mere gasket. I have not considered it necessary to show the bolts, rivets, welding or other fastening by which the parts are held together.

As described, the liquid in the gauge will rise as the float rises and will lower as the float lowers.

As the movement of the one diaphragm downwardly is equalized in its effect upon the fluid pressure within the tank by the corresponding movement of the other diaphragm, maintaining a constant volume of material within the tank, unchanged by the movement of the diaphragm, the reading is free from error due to variation in pressure and vacuum conditions within the tank except for the slight variation in weight upon the lower diaphragm due to difference in gasoline depth above it. The variations in diaphragm pressure due to these variations in the depth of liquid are inconsiderable as compared with the diaphragm movement and are lessened by the control of diaphragm position by the float lever arm. They may be taken care of very readily, in so far as they exist, by a slight change in the calibration of the gauge.

In Figures 3, 4 and 5 a very simple form is shown, which is not intended to be balanced with respect to internal pressure or vacuum and which is provided with a variable lever arm for the float so as to be capable of use within a higher and shorter or narrower tank than that in Figures 1 and 2. This also is applicable to a gasoline tank and a pipe-connected gauge upon an automobile.

In the figures the arm 23' is formed as a yoke, the sides 50, 51 being spaced to straddle the ball float 22' and braced as at 52, 53, 54. The sides are slotted at 55 so that the ball float 22' can move along the arm. Pins 56 engage with the walls of the slots. As a result, the float 22' can move outwardly along the arm as the limits of the tank permit. When the arm is in its highest position, this allows the float to come to the proper surface of the liquid. As the arm falls, by reason of the float lowering with the lowering level of the liquid, the ball will engage the tank wall and will move inwardly toward the pivot point 24' of the arm. It will operate upon a shorter radius as the gasoline level lowers.

The inner ends of the arm 23' are also spaced to give a greater width of effective bearing upon the pivotal rivets 57 within the side brackets 26', 27'. The braces 53 and 54 are conveniently connected by a strip 58 which affords a crank for movement of rod 46' pivoted to it at 47'. This rod operates two diaphragms 33', 34' through the medium of a toggle comprising arms 59 and 60 pivoted to rod 46' at 61. At their other ends the arms are pivoted to lugs 43' upon the diaphragms. The lugs are secured to the diaphragms by bolts upon the lugs screwing into nuts 62 upon the opposite sides of the diaphragms.

The diaphragms control the capacity of compartments 39', 40' within heads 37', 38'. The heads are mounted upon a base 63 flanged at 48' for engagement with a wall (bottom) of the tank. Between the diaphragm I mount a fixed guide 64 for the extension 65 of rod 46'. The base is here extended to include a depression 66' within which the ball may rest so as to permit indications of low tank content.

The compartments are connected with each other and with the gauge upon which the level is to be shown. In this case the diaphragms assist each other and any pressure within the tank is not balanced.

The supports 26', 27' are here found as continuations of the rings 28', 29'.

With this form as with the other it will be obvious that the pressure may be indicated by various forms of gauges and need not be restricted to a sight tube.

Though this form of Figure 5 suffers the disadvantage of not being balanced with respect to the pressure or vacuum within the tank, it obtains a somewhat compensating benefit of giving double the extent of diaphragm movement effective upon the gauge liquid as compared with the form in Figures 1 and 2, permitting a larger cross section of gauge glass, where a glass is used, and thereby reducing the error in the level of the liquid due to any variation in volume which may occur in the connections.

The general form of Figure 5 may be retained while obtaining the advantage of the balanced construction in such a form as that shown in Figures 5ª and 5ᵇ respectively, where the space 39² is connected with the gauge by passage 39³ and the space 40³ is dead. For convenience in manufacture, the center portions of the caps 37², 38² are apertured and are closed by threaded blocks 67. The diaphragms 33', 34' are connected by a strip 68, here shown in the form of a yoke, riveted to the centers of the diaphragms, so that they will move together. The toggle arm 46² is connected with a toggle corresponding generally with that shown in Figure 5, but here shown as operating from above instead of from below. The toggle link 59' is connected by a pivot 69 with the yoke, but the toggle link 60' is connected through pivot 70 with a fixed point, that is a bracket 71 suitably supported, and here thrown across the ring 29².

The operating mechanism for the toggle arm 46² corresponds generally with that of Figure 5 with a slight difference in connections due to mounting the pivot corresponding to 47' directly in one of the cross pieces 59' instead of mounting it in a longitudinally extending piece such as 58. This form may be counter-balanced at 23² as in the case of the form of Figures 3–5.

As will be seen the pivotal point 70 is fixed, with the result that double toggle movement will be given to the diaphragms 33', 34', and, within the limits of the capacity of this diaphragm for movement, twice the extent of diaphragm movement may be provided as compared with that of the same toggle in Figure 5. However, at the same time that the diaphragm 33' moves to the left to increase the volume of the tank outside of the space 39², the diaphragm 34' moves to the left a corresponding distance to reduce the volume, thus maintaining the balance of cubical contents within the tank and eliminating the pressure or vacuum of the tank as an element.

It will be evident that many different forms of diaphragm operation may be used in view of the disclosures herein, and that a like variety of means of transmitting diaphragm movement into gauge readings will occur to those skilled in the art. It is my intention, therefore, not to limit myself to the construction shown but to claim these different elements or their equivalents broadly as well as specifically in different claims, covering thereby all such structures as fall within the fair spirit and scope of my invention.

Having thus described my invention, what I claim as new and desire to secure by Letters Patent is:

1. In a device for indicating at a distance the depth of gasoline in an automobile tank, a float, a lever upon which the float is mounted, a support for the lever, a crank connected with the lever, a rod connected with the crank, a guide for the rod, a toggle having arms connected with the rod, a pair of diaphragms on opposite sides of the rod with which the respective outer ends of the toggle arms are connected, support for the diaphragms, walls connected with the diaphragms and forming diaphragm compartments therewith, a pressure gauge having a gauge compartment, fluid connection between the gauge and diaphragm compartment and liquid within the gauge compartment and connection indicating at the gauge the variation in compartment volume due to movement of the lever arm.

2. In a device for indicating at a distance the depth of gasoline in an automobile tank, a float, a lever upon which the float is mounted, a support for the lever, a crank operated by the lever, a rod connected with the crank, a counter-balance for the lever and float, a toggle connected with the rod, a pair of diaphragms on opposite sides of the rod operatively connected with the toggle, a support for the diaphragms, walls connected with the diaphragms and forming diaphragm compartments therewith free from the gasoline of the tank, a gauge having a compartment, fluid connection between the gauge and diaphragm compartments and liquid within the gauge compartment and connection indicating at the gauge the variation in compartment volume due to movement of the lever arm.

3. In a device for indicating at a distance, the depth of gasoline in an automobile tank, a float, a lever upon which the float is mounted, a support for the lever, a crank operated by the lever, a rod connected with the crank, an automatically changed variable lever-length connection between the float and lever, a toggle connected with the rod, a pair of diaphragms on opposite sides of the rod operatively connected with the toggle, support for the diaphragms, walls connected with the diaphragms and forming diaphragm compartments therewith free from the gasoline of the tank, a gauge, liquid tight connections from one diaphragm compartment to the gauge and liquid within the gauge, connections and compartment indicating at the gauge the variations in compartment volume due to movement of the lever arm.

4. In a device for indicating at a distance the depth of gasoline in an automobile tank, a pressure gauge, a tank, a float, a lever upon which the float is mounted, a support for the lever, a crank operated by the lever, a rod connected with the crank, walls forming a recess for the float below the level of the tank, a toggle connected with the rod, a pair of diaphragms on opposite sides of the rod operatively connected with the toggle, support for the diaphragms, walls connected with the diaphragms and forming diaphragm compartments therewith, free from the gasoline of the tank, liquid tight connections from one diaphragm compartment to the gauge and liquid within the gauge, connections and compartment indicating at the gauge the variation in compartment volume due to movement of the lever arm.

5. In a device for indicating at a distance the depth of gasoline content in an automobile tank, a float, a pivoted lever arm connected with the float, a support to which the lever is pivoted, a rod moved longitudinally by the lever arm, a pair of oppositely facing diaphragms having the facing sides engaging with the gasoline in the tank, connections between the rod and the two diaphragms, walls forming compartments adjacent the other sides of the diaphragms and one of said compartments being within the tank and both of said compartments being separated from the gasoline, a pressure gauge, a connection connected with the compartment within the tank and with the pressure gauge, and liquid in said compartment and gauge for indicating diaphragm movement upon the gauge.

THOMAS M. EYNON.